March 1, 1927.  
H. O. HEM  
COMPUTING SCALE  
Original Filed Aug. 9, 1920    3 Sheets-Sheet 1
1,619,121
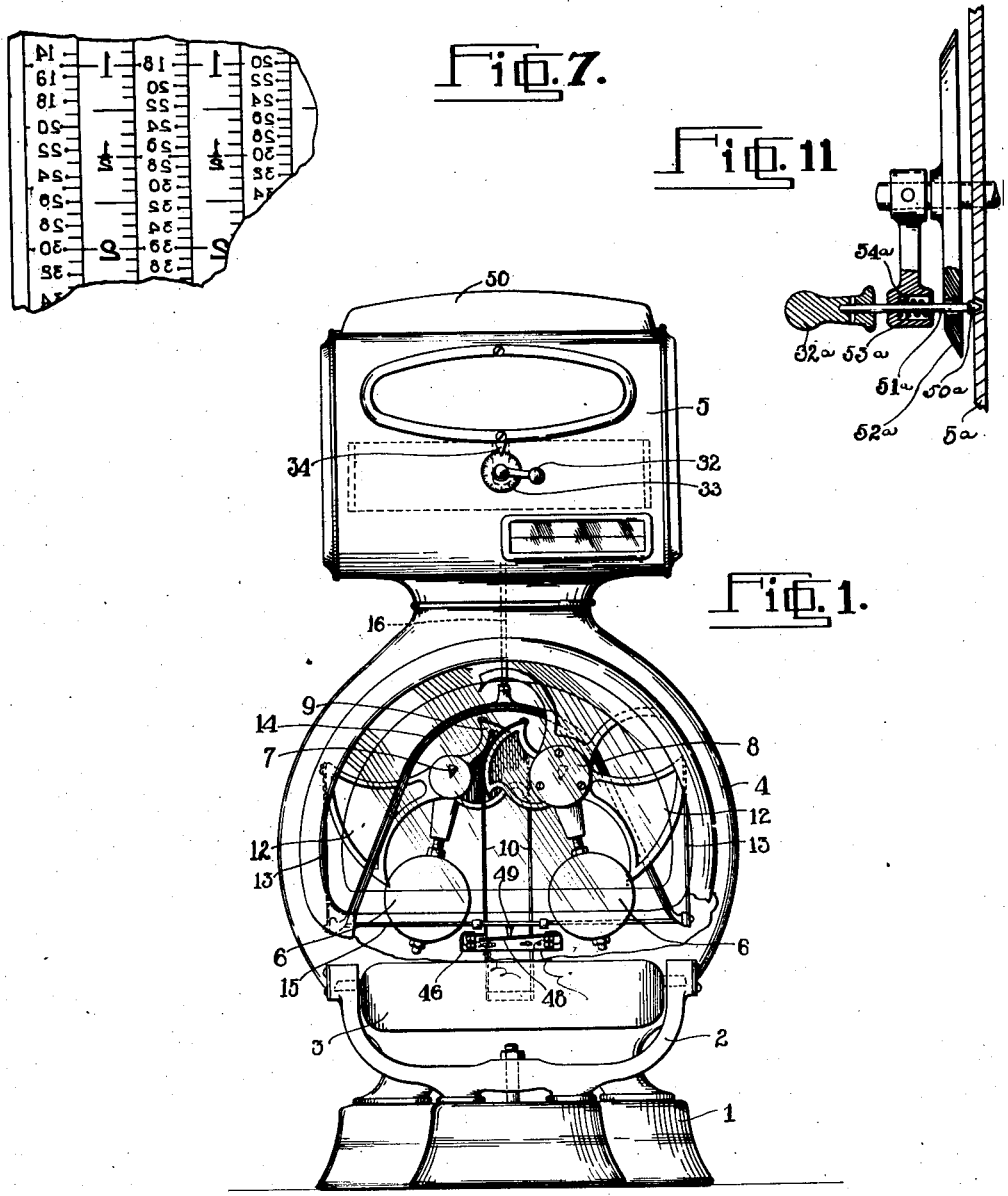
Inventor  
Halvor O. Hem  
By George R. Frye  
Attorney

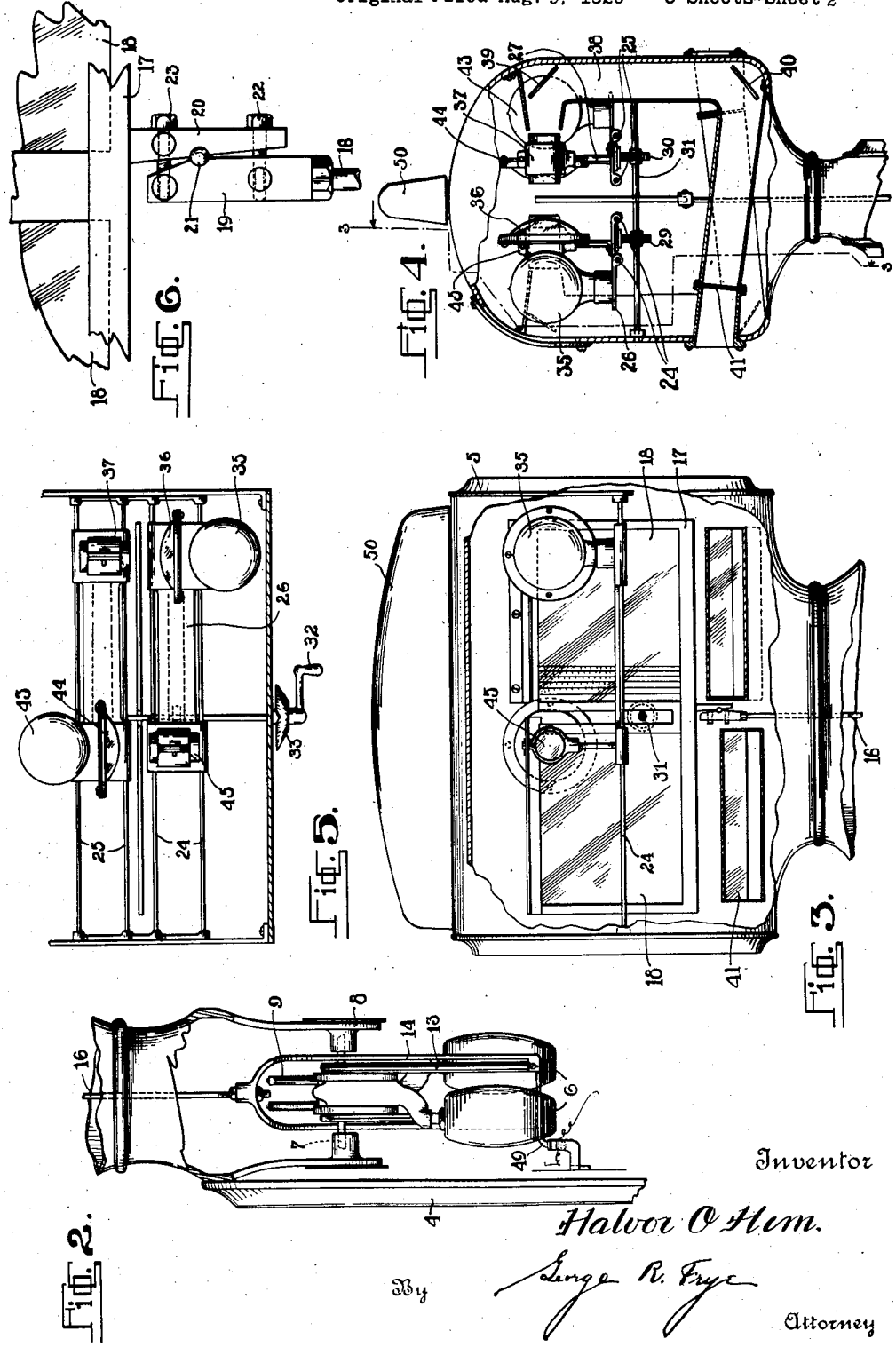

March 1, 1927.  1,619,121
H. O. HEM
COMPUTING SCALE
Original Filed Aug. 9, 1920   3 Sheets-Sheet 3
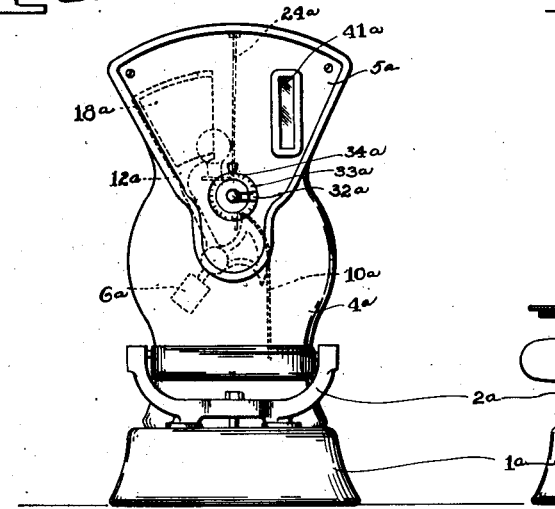
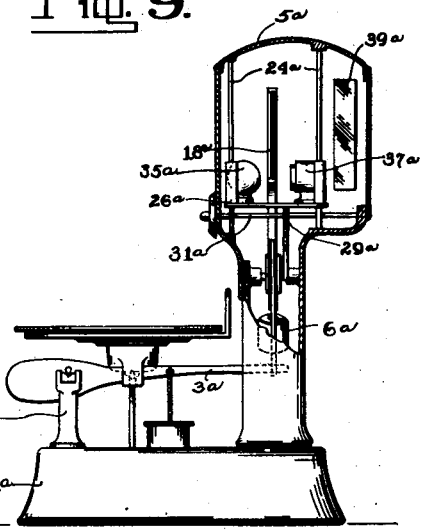
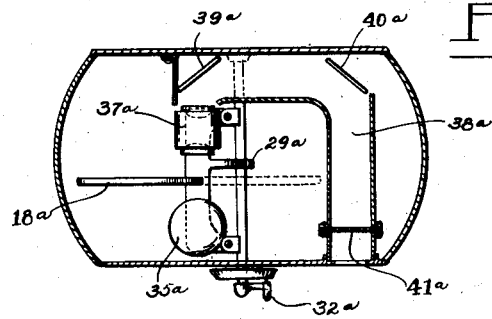
Inventor
Halvor O. Hem.
By George R. Frye
Attorney Patented Mar. 1, 1927.

1,619,121

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

COMPUTING SCALE.

Application filed August 9, 1920, Serial No. 402,303. Renewed July 26, 1926.

This invention relates to weighing scales, particularly to scales of the computing type, and one of its principal objects is to provide a scale of this type having a large capacity and a high degree of accuracy.

Another important object is the provision of a computing scale which indicates weights and money values by means of large figures and widely spaced graduations.

Another object is the provision of a projecting computing scale which shows in large figures upon a screen the money value of a commodity at any selected price, as well as the weight thereof.

Another object is the provision of a projecting scale which indicates weights and money values on the customer's side of the scale as well as on the merchant's side.

Still another object is the provision of a simple and efficient price selecting mechanism.

Other objects and advantages will be apparent from the following description, in which reference is had to the accompanying drawings illustrating preferred embodiments of my invention and wherein similar reference numerals designate similar parts throughout the several views.

In the drawings:—

Figure 1 is a front elevation of a weighing scale embodying my invention, part of the housing being broken away;

Figure 2 is an enlarged fragmentary elevation showing the pendulums and the connection of the indicator therewith;

Figure 3 is an enlarged front elevation of the head of the scale, parts being in section along the line 3—3 of Figure 4;

Figure 4 is a side view of the head of the scale, parts being in section;

Figure 5 is a sectional plan view showing the arrangement of the lights and projecting lenses;

Figure 6 is a fragmentary elevation showing an adjustable connection for the chart;

Figure 7 is a fragmentary detail of the chart;

Figure 8 is a front elevation of a modified embodiment of my invention;

Figure 9 is a side view, partly in section, of the scale shown in Figure 8;

Figure 10 is an enlarged sectional plan of the projecting apparatus; and

Figure 11 is an enlarged fragmentary elevation, with parts in section, showing means for retaining the projecting apparatus shown in Figure 9 in elevated position.

Although I have shown my invention as embodied in scales of the pendulum type, it is to be understood that this showing is merely illustrative and that I contemplate its use in scales having load-counterbalancing mechanism of other types, such, for instance, as springs.

In the form of scale shown in Figures 1 to 7 inclusive, the base 1, which may be of any preferred form, supports a base horn 2 upon which is fulcrumed the main lever 3 of the scale, this lever being adapted to carry the usual commodity-receiver (not shown).

Supported upon the rear end of the base 1 is an upright housing, the lower section 4 of which is shaped somewhat like a watch casing and contains the load-offsetting mechanism of the scale, the upper section 5 of the housing being box-shaped and containing the indicating mechanism.

The load-offsetting mechanism comprises a pair of oppositely-swinging pendulums 6 supported by knife-edge pivots 7 resting in bearings which are fixed to brackets 8 within the watch-casing-shaped housing section 4. Fixed to each pendulum is a power sector 9, and secured to each sector 9 is a flexible metallic ribbon 10 which overlies the curved face of the sector and has its lower end connected to the rear end of the main lever 3. It is apparent that when a load is placed upon the scale the rear end of the lever 3 will be pressed downwardly, thereby creating a downward pull on the ribbons 10 and swinging the pendulums upwardly and outwardly until the load is counterbalanced.

Secured to each pendulum and extending oppositely to the power sector 9 is an indicator operating sector 12, the radius of the sector 12 being considerably greater than the radius of the sector 9. Depending from each of the sectors 12 is a ribbon 13, the lower end of which is attached to a light frame consisting of an inverted U-shaped member 14, the arms of which are connected by a rod 15. As shown in Figures 1 and 2, the pendulums and sectors 12 are oppositely offset so that the parts will not interfere as the pendulums swing and the rod 15 rises.

Projecting upwardly from the bight of the U-shaped member 14 and extending into the box-like housing section 5 is a vertical rod 16, and secured to the upper end of the rod 16 by beans of the adjusting device shown in Figure 6 is a chart frame 17 carrying a pair of charts 18. The adjustable connection between the rod 16 and chart frame 17 consists of a pair of members 19 and 20 spaced by a ball 21 and connected by screws 22 and 23. By loosening one of these screws and tightening the other the frame may be moved angularly in its plane. Secured within the housing section 5 and extending transversely of the scale are two pairs of guide rods 24 and 25, and mounted upon the guide rods 24 is a slide 26, while a similar slide 27 is mounted upon the guide rods 25. The slides 26 and 27 have racks on their lower sides which are engaged by pinions 29 and 30 fixed to a shaft 31 extending between the charts 18 and journaled in the front and rear walls of the housing section 5. The forward end of the shaft 31 projects through the housing wall and is provided with an operating handle 32 and a dial 33 which co-operates with a pointer 34 to indicate the exact position of the slides 26 and 27 for a purpose which will later appear. Fixed upon the right end of the slide 26 is a lamp 35 between which and the chart 18 is mounted a condensing lens 36, and fixed upon the right end of the slide 27 directly opposite the condensing lens 36 is a projector 37. Since the slides 26 and 27 are moved in the same direction and to the same extent by rotation of the shaft 31, the relative positions of the lamp 35, condenser 36 and projector 37 are always the same.

An enclosed passage 38 extends from adjacent the rear side of the projector to the rear of the housing, thence downwardly, and thence forwardly below the chart and through the front housing wall. Mirrors 39 and 40 located at the turns of the passage reflect the light therealong from the projector, and a ground glass screen 41 is positioned adjacent the end of the passage to receive a greatly magnified image of the portion of the chart between the condenser and projector. The ground glass is provided with a reading line, or a member may be arranged in convenient position to throw a shadow upon the ground glass to indicate the chart image that should be read. The portion of the passage extending from the ground glass 41 to the housing wall forms a shadow box which prevents light from falling upon the ground glass from outside sources and thereby dimming the image.

Fixed upon the left end of the slide 27 are a lamp 43 and a condenser 44, and fixed upon the left end of the slide 26 is a projector 45 which projects an image of a portion of the left chart 18 through a passage similar to the passage 38 (above described) but reversibly arranged so that its ground glass screen is visible from the rear side of the scale.

Inscribed upon each chart 18 is a series of columns of graduations, the first, third, fifth, etc. columns being identical and having graduations indicative of weight, while the alternate columns—the second, fourth, sixth, etc.—are graduated and marked to indicate money values at various prices per pound. Owing to the fact that they are to be greatly magnified in the projection, the characters on the chart may be very small and the capacity of the chart may therefore be very great, even though the chart be of small size. For the same reason the scale may have a wide range of prices. The dial 33 is marked with the several prices per pound, and the chart, projector, dial and shifting mechanism are so related that the value projected upon the screen always corresponds to the price indicated upon the dial by the pointer 34. It is to be understood that when a money value is projected upon the screen, the weight indication from the adjoining column of the chart is also shown. The same weights and values are, of course, indicated upon the front and back screens.

The lamps 35 and 43 are in circuit with a switch 46, one contact of which is carried by a resilient member 48 adapted to be engaged by a projection 49 on the rod 15 when the scale is at zero position. When a load is placed upon the scale the pendulums swing upwardly and outwardly, elevating the sectors 12 which act through the ribbons 13 to raise the frame 14, 15. The switch 46 is thus allowed to close and the lamps are lighted. The weight of the article, together with its value at the particular price indicated by the pointer 34, is thrown upon both screens. Extreme upward movement of the chart is permitted by an opening in the top of the housing, which is closed by means of a cap 50 into which the charts may move. The opening and the cap 50 also form a cupola ventilator to carry away the heated air from the interior of the housing. By turning the handle 32 any desired price may be brought into registration with the pointer and the corresponding money value will then be indicated on the screens. The indications at different prices per pound will appear in different positions on the screens. The indication at the lowest price per pound may appear at the extreme left of the screen and the indication at the highest price per pound at the extreme right. The value at only a single price is indicated at one time, however, and the magnified images occupy such a large part of the screen area that the effect is substantially the same as though each appeared in the same position.

In Figures 8, 9 and 10 I have shown my invention as applied to a pendulum scale having a chart rigidly fixed to the pendulum. The base $1^a$ of this scale supports a base horn or fulcrum stand $2^a$ upon which is secured the main lever $3^a$ carrying a commodity-receiver of common form. Supported upon the rear end of the base is an upright housing, the lower portion $4^a$ of which contains the load-offsetting pendulum, the upper portion $5^a$ containing the chart and projecting apparatus. A load-offsetting pendulum $6^a$ is connected to the lever $3^a$ by means of a flexible metallic ribbon $10^a$, and carries an upwardly-extending arm $12^a$ of light material, to which is fixed a transparent chart $18^a$. Secured within the upper portion of the housing is a pair of vertically-extending guide rods $24^a$, and mounted upon these rods is a slide $26^a$ having a depending rack secured thereto which is engaged by a pinion $29^a$ fixed upon the shaft $31^a$ journaled in the front and rear walls of the housing. The forward end of the shaft projects through the housing wall and is provided with an operating handle $32^a$ and a dial $33^a$ which co-operates with a pointer $34^a$ to indicate the exact position of the slide $26^a$.

Fixed upon the slide $26^a$ forwardly of the chart $18^a$ is a lamp $35^a$, and fixed upon the slide on the opposite side of the chart is a projector $37^a$. An enclosed passage $38^a$ extends from adjacent the rear side of the projector to the rear of the base housing, thence laterally to adjacent the side of the housing, and thence forwardly through the front wall. Mirrors $39^a$ and $40^a$ located at the turns of the passage reflect the light therealong from the projector, and a ground glass screen $41^a$ is positioned adjacent the end of the passage to receive a greatly magnified image of the portion of the chart before the projector. The ground glass is provided with a vertical reading line, or an equivalent shadow is projected thereon. The portion of the passage extending from the ground glass to the housing wall forms a shadow box which prevents light from falling upon the ground glass from outside sources and thereby dimming the image. The chart is inscribed with concentric curved rows of characters, rows of weight indicating characters and money value characters alternating as in the form first described, and the dial $33^a$ is correspondingly marked with the several prices per pound.

In order to prevent the projecting apparatus from accidentally sliding downwardly upon the guide rods $24^a$, I have provided the handle $32^a$ with a cone-shaped detent $50^a$ for selective engagement with a circular series of depressions in the wall of the housing $5^a$, there being one depression for each price. As shown in Figure 11, the handle $32^a$ and detent $50^a$ are fixed to a slidably mounted shaft $51^a$ upon which is a collar $52^a$. The collar $52^a$ is engaged by a spring $53^a$ located within a depression $54^a$ in the crank arm of the handle, which urges the detent into engagement with the notch.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a weighing scale, in combination, a chart having rows of graduations thereon, a projector adapted to project a real image of a portion of said chart, said chart and projector being relatively movable, manually operable means for moving one of said elements in one direction, and weighing mechanism connected to the other of said elements to move it in another direction.

2. In a weighing scale, in combination, a chart movable in one direction, a projector movable over said chart in another direction, weighing mechanism for moving one of said elements, and manually-operable means for moving the other of said elements.

3. In a weighing scale, in combination, a chart having rows of money value characters, each row corresponding to a price per unit of weight, a projector, said chart and projector being relatively movable, weighing mechanism connected to one of said elements, and manually-operable means for selectively positioning the other of said elements according to prices per pound, whereby the money value of a load on the scale is indicated by said projector.

4. In a weighing scale, in combination, weighing mechanism, a chart connected thereto and having rows of money value characters, each row corresponding to a price per pound, a projector, and manually-operable means for shifting said projector into position to project the characters of a selected row.

5. In a weighing scale, in combination, weighing mechanism, a chart connected thereto, a projector co-operating with said chart, and means for selectively positioning said projector according to prices per unit of weight.

6. In a weighing scale, in combination, weighing mechanism, a chart connected thereto, a projector co-operating with said chart, means for selectively positioning said projector according to prices per unit of weight, and means for indicating the price corresponding to the position of said projector.

7. In a weighing scale, in combination, weighing mechanism, a chart connected thereto, a projector co-operating with said chart, manually-operable means for selectively positioning said projector according to prices per unit of weight, and means on said positioning means for indicating the price corresponding to the position of said projector.

8. In a weighing scale, in combination, weighing mechanism, indicating mechanism connected therewith, said indicating mechanism comprising a plurality of screens, and means for simultaneously projecting identical indications upon said screens.

9. In a weighing scale, in combination, weighing mechanism, indicating mechanism connected therewith, said indicating mechanism comprising a pair of oppositely-facing screens, and means for simultaneously projecting identical indications on said oppositely-facing screens.

10. In a weighing scale, in combination, weighing mechanism, a pair of charts connected therewith, oppositely-facing screens, one for each chart, and means for simultaneously projecting identical indications from said charts upon said screens.

11. In a weighing scale, in combination, weighing mechanism, a pair of charts connected thereto, a pair of projectors co-operating respectively with said charts, and manually-operable means for shifting said projectors over said charts.

12. In a weighing scale, in combination, weighing mechanism, a pair of charts connected thereto and inscribed with identical money values, a pair of projectors, one for each chart, and means for simultaneously positioning said projectors according to a price per unit of weight, whereby the same value indication is projected by each projector.

13. In a weighing scale, in combination, pendulum load-offsetting mechanism, a chart connected thereto, a projector co-operating with said chart, and manually-operable means for shifting said projector over said chart.

14. In a weighing scale, in combination, automatic weighing mechanism, and a chart co-operating therewith, said chart having alternate rows of weight and money value graduations and shiftable projecting means adapted to co-operate selectively with said rows of weight and money value graduations.

15. In a weighing scale, in combination, automatic weighing mechanism, and a movable chart connected thereto, said chart having alternate rows of weight and money value graduations and shiftable projecting means adapted to co-operate selectively with said rows of weight and money value graduations.

16. In a weighing scale, in combination, automatic weighing mechanism, a movable chart connected thereto, said chart having alternate rows of weight and money value graduations, and a projector adapted to simultaneously project a money value indication and a weight indication from adjacent columns.

17. In a weighing scale, in combination, a chart, a carriage movable therealong, and illuminating and projecting means mounted on said carriage.

18. In a weighing scale, in combination, oppositely-facing charts, a carriage movable along said charts, illuminating means for one of said charts, and projecting means for the other of said charts, said illuminating and projecting means being mounted upon said carriage.

HALVOR O. HEM.